Nov. 15, 1932.  J. R. BIEDINGER  1,888,155
RACK
Filed Feb. 13, 1930  3 Sheets-Sheet 2

INVENTOR.
John R. Biedinger
BY Allen + Allen
ATTORNEYS.

Nov. 15, 1932.  J. R. BIEDINGER  1,888,155

RACK

Filed Feb. 13, 1930   3 Sheets-Sheet 3

INVENTOR.
John R. Biedinger
BY Allen & Allen
ATTORNEYS

Patented Nov. 15, 1932

1,888,155

UNITED STATES PATENT OFFICE

JOHN R. BIEDINGER, OF CINCINNATI, OHIO, ASSIGNOR TO CARTHAGE MILLS, INCORPORATED, OF CARTHAGE, OHIO, A CORPORATION OF OHIO

RACK

Application filed February 13, 1930. Serial No. 428,160.

My invention is applicable to drying racks or other racks adaptable to a wide variety of uses in the treatment or storage of materials. I shall particularly describe one type of rack suitable for the drying of the paint coatings upon felt base floor coverings, it being understood that my invention is not limited to the structure described as exemplary, although embodied therein. The production of felt base floor coverings entails, after the printing operation, a more or less protracted period of drying which is usually accomplished in heated air in insulated compartments or rooms, comparatively narrow but of a length great enough to accommodate a commercial size strip of felt base floor covering laid out flat. In order to economize in space, racks are provided in these chambers adapted to maintain a large number of strips of floor covering laid out flat and in superposed but separated relationship. These racks have hitherto been very expensive to construct and maintain and have represented a very large part of the capital outlay in a plant manufacturing these products. Frames of heavy channel irons have been constructed at intervals of a few feet along the length of the chambers, the axis of the frames lying transverse thereto. The side channel iron members have been perforated at intervals of a few inches vertically for the reception of rods; and round iron or steel rods have been bolted into these perforations. If the frames are of considerable width, these rods have to be substantially quite heavy. Each has had to be threaded at one end if provided with a head at the other, or at both ends; and a plurality of nuts has had to be provided to hold the rods in place, requiring individual tightening. Since 40 or more of these rods may be disposed in vertically interspaced relationship in each frame and since there may be about 30 or more of these frames in each chamber, and since the number of chambers will depend upon the size and capacity of the plant and may run up into a fairly large number, it will be seen that in the average installation there are hundreds of frames, thousands of rods and many thousands of bolts to be tightened. It has been the practice to run wires the length of the chambers resting in interspaced relationship upon the rods. The floor covering material is carried along over these wires. Between frames, it is supported by the wires; in the frames it is supported by the rods and the rods in turn are supported by the channel iron members of the frames. Since the rods have very little stiffness transversely, it is necessary to tighten them so that they will not sag and permit one layer of the floor material to contact with the one beneath. This tightening requires individual attention to each rod and constant maintenance. It also necessitates the use of very heavy channel iron side members in the frames for the reason that these members not only have to sustain vertically the weight of the entire assembly and the material on the racks, but also have to sustain the sidewise pull of the tensioned rods. Again in these drying chambers, the heated atmosphere, the presence of some moisture perhaps from steam escaping from the heating coils, and possibly from the presence of solvents and volatile matter from the paints in the atmosphere, the rods are subject to corrosion and must frequently be repaired or replaced. In some constructions it has been necessary to leave an abnormal distance between the sides of the rack and the side walls of the chamber to permit the removal of the rods, particularly where the rods are headed and can be removed from one side only. In general, the rods carry nuts on both sides of each channel iron making four members to be tightened and necessitating the cutting of threads for a great distance inwardly of each end of the rods. All of these factors have contributed to a great lack of economy in the initial cost of racks and a very high maintenance cost, together with much inconvenience.

An object of my invention is to provide a rack of this character which not only is very much less in initial cost but is cheaper to maintain, stronger, less likely to fail in use, more rigid as to the support furnished by the cross members in the frames, more economical of space, and easier and more economical to repair, and which may be made wider than hitherto.

These and other objects of my invention which will be pointed out hereinafter or will be apparent to one skilled in the art upon reading these specifications, I accomplish by that certain construction and arrangement of parts of which I shall now describe an embodiment preferred by me for use as a drying rack for the purpose hereinabove set forth, it being understood that my invention is adaptable to racks for other purposes and to other uses than in drying or heat treating materials. Changes in dimensions and the like together with arrangements of structural elements to adapt my rack to such other uses are within the province of those skilled in the art to make without departing from the spirit of my invention. Reference is made to the drawings which form a part of these specifications.

Figure 1:
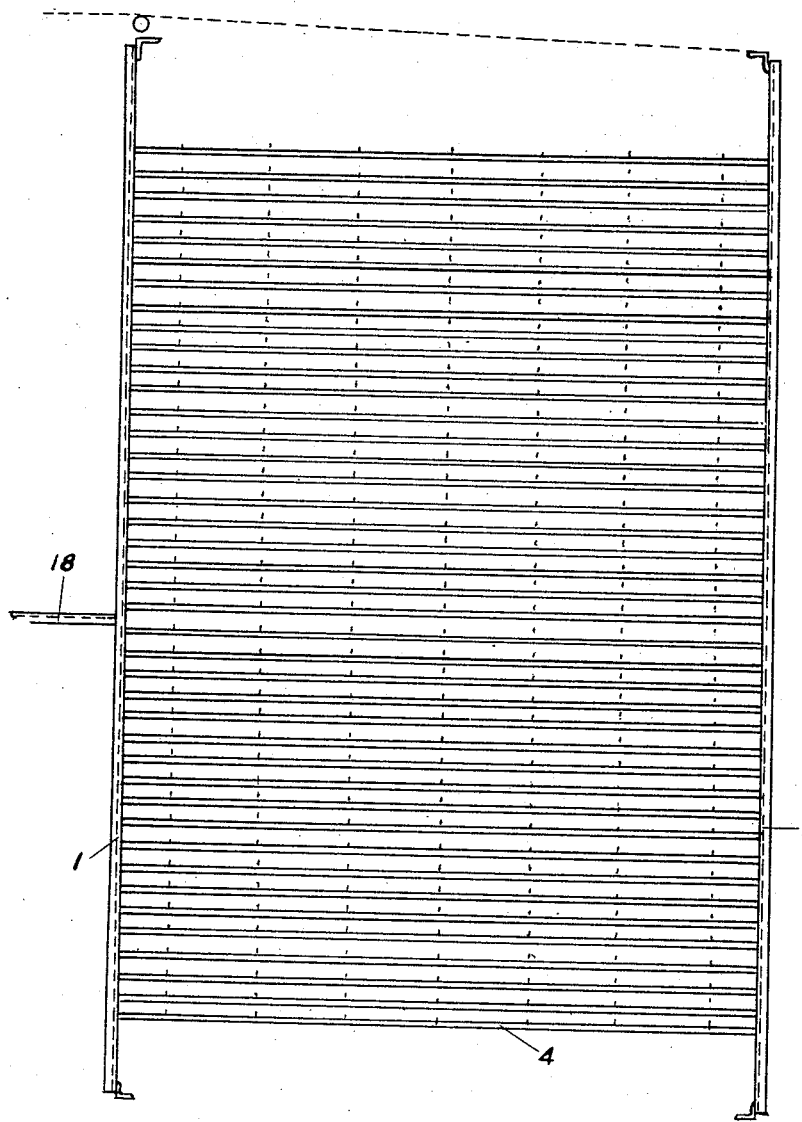
Figure 1 is a front elevation of one of the frame members of my rack.

One of the features of my invention is that I employ as transverse members in the frames, structural elements of such stiffness that they do not need to be tensioned and for this reason I am enabled to use frame supporting members of sufficient size merely to sustain the weight imposed upon them and of sufficient transverse stiffness merely to keep the frame from wobbling, and I thus use members which are very much smaller and very much less heavy than those hitherto used. I employ channel members 1 in my frames, although other structural elements are suitable for the purpose. These channel members I position and fasten in place vertically in any way desired. In the particular embodiment shown, these members are bolted or riveted to floor rails 2 and ceiling rails 3 which are angle irons; but they may be let into the masonry or otherwise fastened. The use of rails is advantageous in that the channel members of the frames may be readily replaced; and the rails serve to keep the several channel members in alignment down the length of the chamber. I cut or stamp in the webs of my channel members 1, openings 2a, which in the embodiment shown are triangular with the apex of the triangle pointing upwardly. The shape of these perforations will be determined by the shape of the transverse supporting members employed. These may be of different shapes but preferably they are structural members of sufficient inherent strength to be rigid without tensioning. They may be T-rails, I-rails, channel irons or any other suitable structural shape; but the shape which I prefer and which I have found cheapest both in first cost and in use are 60° angle iron members designated in the several figures at 4. These are light angles which may be separately rolled, or formed by bending sheet stock. In drying racks for felt base floor covering, each leg of the angle will be, say, an inch to an inch and a half in width and I have found that structural members of this character, while resilient and subject to some sagging under heavy weights, will in a span of the character described, support the weight of a man. This is of advantage both in installation and repair. It will be understood, as shown in Figure 1, that one of the channel side members 1 is located on opposite sides of each frame positioned vertically, and that a series of the transverse supporting angle members 4 extends between them, the number of angle members being determined by the size of the frame and the use for which it is intended. The supporting members 4 are provided near each end with a hole 5, in one of the legs of the angle. In use they are assembled in the channel members of the frame first by inserting one end of the angle through a perforation in one of the channel side members and placing a cotter pin 6 through the hole 5. The angle member is inserted far enough to clear the opposite channel member whereupon the other end thereof is inserted in the corresponding hole of said opposite channel member, and another cotter pin placed through the hole in the angle member therebeyond. These cotter pins prevent the endwise withdrawal of the angle members from the channel members. Means other than cotter pins may be employed for the same purpose such as bolts, clamps, rivets and the like; but I have found the use of cotter pins the least expensive of those expedients which I may employ. A series of these frames and transverse supporting members may be imagined as located at intervals along the length of a chamber.

Figure 2:
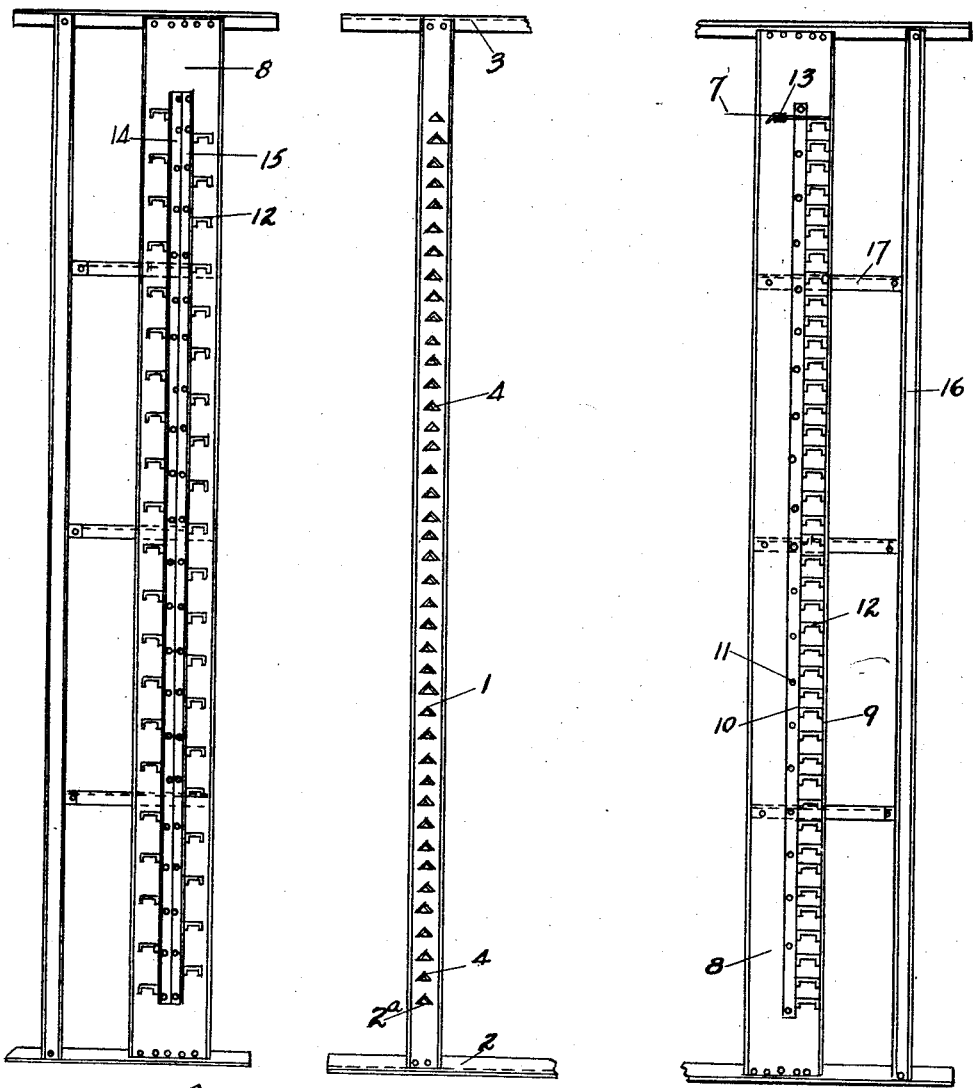
Figure 2 is a sectional view vertically through portions of my rack structure.
Figure 3:
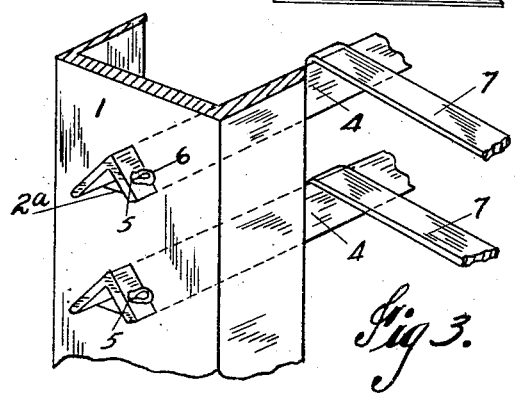
Figure 3 is a partial perspective of a frame showing the relationship to a channel member of the transverse supporting members and the bands.
Figure 4:
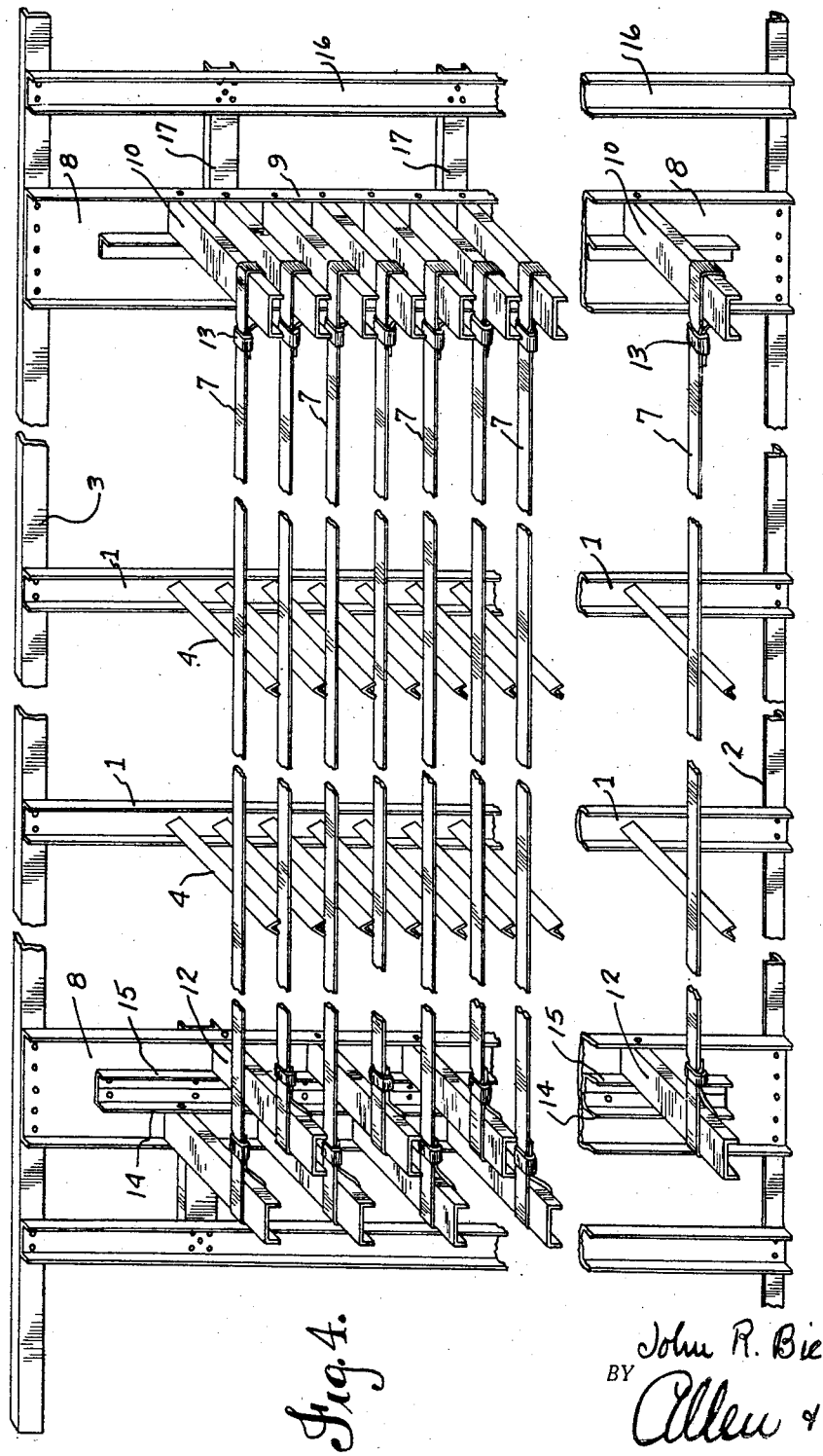
Fig. 4 is a partial perspective view of my rack structure, with part cut away.

In my preferred structure, I do not employ wires running the length of the chambers and resting upon the supporting members, although I may do so. Instead I prefer to employ narrow flat bands of metal 7. Such bands are commonly used instead of wire for baling materials; they are inexpensive and I find that they offer a better support for materials on the rack because of their broader bearing surface. They are tightened longitudinally of the chambers as the wires have hitherto been tightened. Consequently at either end of the chamber, I provide abutments against which this tensioning of the bands may be made. In Figure 2, I have shown at the right end of the rack a structure comprising a heavy vertical channel member 8, between the outer web 9 of which and an angle iron 10 (interspaced from said web and fastened as by bolts or rivets 11 to the main web of the channel member 8), I position and fasten structural supporting members 12, which in this case are channel members. The bands 7 are drawn around these channel members and fastened in any way desired. A convenient way comprises crimping with the ordinary shield or sheath 13, as is practiced in the use of these bands in baling.

A somewhat different type of end structure is illustrated at the other end of the rack in Figure 2, where the channel member 8 has centrally of its main web, angle members 14 and 15 between which and the outer webs, the channels 12 are fastened in alternate steps. This permits a greater separation of the channel members and facilitates tensioning and tightening of the bands 7 thereabout. The end members may have additional vertical structural members 16 and connecting members 17 as shown; or they may have other elements appropriate to any given structure, such as ladders and the like. It will be understood that more than one rack may be placed in any given compartment providing the compartment is wide enough, and a passage way left between. Oppositely disposed channel members of adjacent frames may be connected by struts 18.

Various modifications may be made in my invention without departing from the spirit thereof.

Having thus described my invention, what I claim as new and desire to secure by Letters Patent, is:

1. In a rack the combination of spaced vertically extending frames, supporting members transverse of said frames, said supporting members being of angular formation having stiffness without tensioning, and supporting bands of metal running longitudinally of said rack and resting on said supporting members, said supporting members comprising angle irons disposed with their angles upwardly.

2. A rack comprising a plurality of frame members having opposed vertically extending supporting channels, transverse horizontally extending supporting members in said frames, said supporting members comprising angle irons the ends of said angle irons projecting through perforations in said channels and loosely held therein against removal, longitudinal bands of metal resting upon said supporting members, end members for said rack, said bands of metal tensioned against said end members at opposite ends of said rack.

3. In a rack of the class described, frames comprising opposed vertically extending channels, a plurality of transverse horizontally extending supporting members in said frame, said supporting members being angle irons with their angles disposed upwardly, said irons extending through perforations in said channels at either end and held against removal by cotter pins, end members on said rack comprising vertically extending channels and horizontally extending channels, and supporting members of band iron extending the length of said rack between said last mentioned channels, resting upon said supporting members, and tensioned between said channels.

4. In a rack for supporting superposed relatively long and wide sheets, a longitudinal series of opposite upright side members, transverse members with their opposite end parts secured in respective side members, whereby superposed longitudinal series of said transverse members are constituted, and transverse series of longitudinal flat bands supported on the respective series of transverse members, to receive the sheets of material.

5. In a rack for supporting superposed relatively long and wide sheets, a longitudinal series of opposite upright side members, each having substantially triangular openings having their apexes upward, transverse angle bars with their opposite end parts disposed through respective ones of said openings in respective side members, with their edges resting on the base edges of the openings whereby superposed longitudinal series of said transverse members are constituted, and transverse series of longitudinal elements supported on the respective series of transverse members, to receive the sheets of material.

6. In a rack for supporting superposed relatively long and wide sheets, a longitudinal series of opposite upright side members, each having substantially triangular openings having their apexes upward, transverse angle bars with their opposite end parts disposed through said openings with extension outside the side members having round openings, said angle bars having edges resting on the base edges of respective openings, whereby superposed longitudinal series of said transverse members are constituted, round pins inserted loosely through the respective openings in said extensions, and transverse series of longitudinal elements supported on the apex edges of respective series of transverse members, to receive the sheets of material.

7. In a rack for supporting superposed relatively long and wide sheets, a longitudinal series of opposite upright side members, each having substantially triangular openings having their apexes upward, transverse angle bars with their upper end parts disposed through respective ones of said openings in respective side members, with their edges resting on the base edges of the openings, whereby superposed longitudinal series of said transverse members are constituted, and transverse series of longitudinal flat bands supported on the respective series of transverse members, to receive the sheets of material.

8. In a rack for supporting superposed relatively long and wide sheets, a longitudinal series of opposite upright side members, transverse members with their opposite end parts loosely secured in respective side members, whereby superposed longitudinal series of said transverse members are constituted, terminal opposite upright side members at the ends of the series, superposed terminal transverse members with their opposite ends substantially rigidly secured to the respective opposite terminal members, and transverse series of longitudinal flat bands supported on the respective series of transverse members, to receive the sheets of material, said bands having their end parts substantially tightly secured to the respective terminal transverse members.

JOHN R. BIEDINGER.